United States Patent [19]
House

[11] Patent Number: 5,807,482
[45] Date of Patent: Sep. 15, 1998

[54] CHIRAL STATIONARY PHASE BASED ON YOHIMBINIC ACID

[75] Inventor: David W. House, Arlington Heights, Ill.

[73] Assignee: UOP LLC, Des Plaines, Ill.

[21] Appl. No.: 962,551

[22] Filed: Oct. 31, 1997

[51] Int. Cl.[6] .................................................. B01D 15/08
[52] U.S. Cl. .................................. 210/198.2; 210/502.1; 210/635; 210/656; 502/401
[58] Field of Search ..................................... 210/635, 656, 210/198.2, 502.1; 502/400, 401

[56] References Cited

U.S. PATENT DOCUMENTS

| | | | |
|---|---|---|---|
| 3,673,214 | 6/1972 | Albright | 260/326.3 |
| 3,677,410 | 7/1972 | Okumura | 210/198.2 |
| 4,299,967 | 11/1981 | Dingwall | 549/65 |
| 4,335,057 | 6/1982 | Dingwall | 562/114 |
| 4,818,394 | 4/1989 | Okamoto | 210/198.2 |
| 4,919,709 | 4/1990 | Moser | 504/342 |
| 5,344,776 | 9/1994 | Venter | 435/252.3 |
| 5,474,898 | 12/1995 | Venter | 435/6 |

*Primary Examiner*—Ernest G. Therkorn
*Attorney, Agent, or Firm*—Thomas K. McBride; Frank S. Molinaro

[57] ABSTRACT

A set of chiral stationary phases is based on yohimbine and its derivatives. One set of chiral stationary phases is based on a coating of yohimbine and yohimbine derivatives, and another set is based on covalent linkage of the chiral organic material to the underlying support. Both sets are effective in resolving enantiomeric mixtures.

9 Claims, No Drawings

CHIRAL STATIONARY PHASE BASED ON YOHIMBINIC ACID

BACKGROUND OF THE INVENTION

Ever since Pasteur discovered the property of optical activity displayed by chiral compounds, the resolution of racemic mixtures into their enantiomeric components has posed a challenge. Substantial progress in separating enantiomeric pairs has been achieved since Pasteur's laborious hand separation of the enantiomeric crystals of racemic sodium ammonium tartrate, yet methods of resolution, and the materials used therefor, remain a formidable obstacle to commercial production of optically active organic substances.

A traditional method of resolution comprises reacting a racemic mixture with a second optically active substance to form a pair of diastereomeric derivatives. Such derivatives generally have different physical properties which permit their separation by conventional means. For example, fractional crystallization often permits substantial separation to afford at least one of the diastereomers in a pure state, or largely so. An appropriate chemical transformation then converts the purified derivative, which was formed initially solely to prepare a diastereomeric pair, into one enantiomer of the originally racemic compound. This traditional method is exemplified by the reaction of naturally occurring optically active alkaloids, for example, brucine, with racemic acids to form diastereomeric salts, with release of an optically active organic acid from a purified diastereomer upon acidification of the latter.

Such traditional methods suffer from many limitations. Generally, only one of the enantiomeric pairs can be obtained, so yields are necessarily less than 50%. The separation of the material so obtained usually is incomplete, leading to materials with enhanced rather than complete optical purity. The optically active materials used to form the diastereomers frequently are expensive and quite toxic—the alkaloids as a class are good examples—and are only partially recoverable. Regeneration of optically active material from its derivative may itself cause racemization of the desired compound, leading to diminution of optical purity. For example if optically active benzyl alcohols are prepared through their diastereomeric ester derivatives, subsequent acid hydrolysis of the latter to regenerate the alcohol may be accompanied by appreciable racemization.

With the advent of chromatography diverse variations on the basic theme of separating diastereomers became possible. These approaches undeniably represent substantial advances in the art, yet fail to surmount the basic need, and associated problems, to prepare diastereomeric derivatives of the desired compound and to transform such derivatives after separation to the optically active compounds of interest.

Chromatographic methods of separating diastereomers offer advantages of general application, mild conditions which generally preclude chemical or physical transformation, efficiency of recovery and separation which are limited only by the number of theoretical plates employed and the capability of utilization from a milligram to kilogram scale. Translation from a laboratory to industrial scale has proved feasible, and commercial processes employing chromatographic separation occupy an important position in the arsenal of available industrial methods. For such reasons, methods based on chromatographic separation remain under intensive exploration.

To circumvent the disadvantage of separating diastereomeric derivatives of a compound while retaining the advantage of chromatographic separation, recent advances in the art have employed chiral, optically active compounds in association with the chromatographic support. The theory underlying this approach is that chiral material will have differential weak interactions with enantiomers, for example, hydrogen bonding, or acid-base interactions generally. Such weak interactions lead to reversible formation of entities which we refer to as complexes, and the equilibrium constant characterizing complex formation will be different for each member of the enantiomeric pair. The different equilibrium constants manifest themselves as a differing partition coefficient among the phases in a chromatographic process, leading ultimately to separation of enantiomers.

Thus, enantiomers of some chromium complexes were resolved by chromatography on powdered quartz, a naturally occurring chiral material. Karagounis and Coumolos, *Nature*, 142, 162 (1938). Lactose, another naturally occurring chiral material, was used to separate p-phenylene-bis-iminocamphor. Henderson and Rule, *Nature*, 141, 917 (1938). However, despite this knowledge substantiating theoretical considerations, advances in the art have been tortuous at best.

A major obstacle has been development of a chiral solid phase capable of resolving, at least in principle, a broad class of racemic organic compounds, with a stability which permits repeated usage, and with adequate capacity to make separation feasible on a preparative scale. Gil-Av has made a major contribution toward one kind of solution by gas-liquid phase chromatographic resolution of enantiomers using columns coated with N-trifluoroacetyl derivatives of amino acids, di-and tri-peptides. Gil-Av and Nurok, "Advances in Chromatography", Volume 10, Marcel Dekker (New York), 1974. However, the advances suffer practical limitations originating from the need to have volatile substrates and the inability to scale up the methods employed.

Another advance is represented by the work of Baczuk and coworkers, *J. Chromatogr.*, 60, 351 (1971), who covalently bonded an optically active amino acid through a cyanuric acid linkage to a modified dextran support and utilized the resulting material in column chromatography to resolve 3,4-dihydroxyphenylalanine. A different approach is exemplified by polymerization of optically active amides with the resulting polymer used as a solid phase in liquid-solid chromatography. Blaschke and Schwanghart, *Chemische Berichte*, 109, 1967 (1976).

More recently it has become an accepted reality that enantiomeric medicinals may have radically different pharmacological activity. For example, the (R)-isomer of propranolol is a contraceptive whereas the (S)-isomer is a betablocker. An even more dramatic and tragic difference is furnished by thalidomide where the (R)-enantiomer is a safe and effective sedative when prescribed for the control of morning sickness during pregnancy whereas the (S)-enantiomer was discovered to be a potent teratogen leaving in its wake a multitude of infants deformed at birth. This has, in part, provided the motivation for developing additional tools for chiral separations. Chromatographic processes, especially liquid chromatography, appear to offer the best prospects for chiral separations. One variant of the latter utilizes achiral eluents in combination with chiral stationary phases (CSPs), which has the critical aspect that a variety of chiral stationary phases be available to the practitioner. In recent years substantial progress has been made by developing a class of chiral stationary phases based upon derivatized polysaccharides, especially cellulose, adsorbed on a carrier such as silica gel or a modified silica gel. This recently has been summarized by Y. Okamoto, *J. Chromatog.*, 666 (1994), 403–19.

However effective may be the aforedescribed supports based on polysaccharides, there remains a need for chiral stationary phases where chirality is imparted by a monomer rather than by oligomers or polymers as represented by the polysaccharides. To be optimally useful the chiral monomer should have a plurality of chiral sites, so as to offer several chiral recognition sites and afford the potential of being broadly used in chiral separations. An appropriate monomer also should afford a CSP based both on adsorption of the chiral monomer as well as covalent linkage of the monomer to the underlying carrier. Covalently attaching the chiral monomer to a carrier virtually eliminates leaching, regardless of the mobile phase. This permits the use of many more types of mobile phases, as well as permitting switching from forward to reverse phase eluents using the same column without fear of destroying the CSP due to leaching or plugging of the column. This benefit makes the CSPs much more effective for traditional single pass chromatography, for recycle-type chromatography, for simulated moving bed-based chromatography, and simple preferential adsorption of one enantiomer over the other.

The use of a monomeric chiral host containing several chiral centers providing a plurality of potential chiral interactions offers the possibility of a chiral stationary phase manifesting broad chiral discrimination. Yohimbinic acid is a chiral material with several easily derivatizable sites making this chiral host readily modifiable to "tune" its selectivity according to the racemate to be resolved. Furthermore, the use of this monomer should lead to chiral stationary phases with good mass transfer properties more similar to brush-type stationary phases, whereas CSPs based on high carbon-loaded derivitized cellulosics show impaired mass transfer properties. Yohimbinic acid-based CSPs according to our invention described within may be expected to be effective in both analytical and preparative chromatography, especially simulated moving-bed chromatography.

SUMMARY OF THE INVENTION

The purpose of our invention is to prepare a variety of chiral stationary phases based on yohimbinic acid manifesting broad chiral discrimination. An embodiment comprises a passivated silica gel coated with yohimbinic acid or a derivative thereof. In a more specific embodiment, the derivative is a yohimbinic acid ester. In another specific embodiment the derivative is an ether of yohimbinic acid. Another embodiment is a yohimbinic acid or a derivative thereof covalently bonded to an underlying silica carrier via an aminoalkylsilyl spacer. A specific embodiment of this variant is one where the amino group is the covalent link bonding yohimbinic acid to the spacer molecule. In a more specific embodiment the CSP is yohimbinic acid amide of 3-aminopropylsilanized silica. Other embodiments will be apparent from our ensuing description.

DESCRIPTION OF THE INVENTION

The need for broadly-effective, "general-purpose" chiral stationary phases reflects the need for chiral stationary phases having 1) an organic monomer as the chiral recognition agent, 2) the potential to have broad chiral discrimination associated with a plurality of chiral sites, and 3) both a coated and covalently-bound analog based on the same underlying chiral organic material. Our invention fills these needs by using yohimbinic acid and its derivatives as the chiral organic material with a multiplicity of chiral recognition centers. Yohimbinic acid and its derivatives may be used merely as a coating on carriers of porous refractory inorganic oxides, or they may be covalently bound to the underlying carrier via an aminoalkylsilyl spacer. Because yohimbinic acid has multiple functionality, several sites may be derivatized independently to alter and customize chiral recognition for optimum resolution of specific enantiomeric pairs.

The chiral stationary phases of our invention consist of a carrier, which is a refractory inorganic oxide, and yohimbinic acid or a derivative thereof, where the yohimbinic acid or derivative thereof is present either as a coating on a carrier (i.e., "ionically" bound) or is covalently bound to the carrier via a spacer.

The carriers of our invention are refractory inorganic oxides which generally have a surface area of at least about 35 $m^2/g$, preferably greater than about 50 $m^2/g$ and more desirably greater than 100 $m^2/g$. There appears to be some advantage to working with materials having as high a surface area as possible, although many exceptions are known which preclude making this a general statement. Suitable refractory inorganic oxides include alumina, titania, zirconia, chromia, silica, boria, silica-alumina and combinations thereof. Of these, silica is particularly preferred as a carrier in chromatographic separations. Where the chiral stationary phase is merely a coated carrier, the carrier can be "passivated" by prior treatment with a suitable silane. This aspect of the procedure is well documented and does not need to be reviewed in any detail at this time; see, for example, Okamoto et al., U.S. Pat. No. 4,818,394 for a representative procedure. Passivation frequently is performed by treatment with an aminopropylsilane although other passivating agents, such as octadecyltriethoxysilane or phenyltriethoxysilane, can be substituted for aminopropyltriethoxysilane in many cases.

Where the chiral stationary phase is yohimbinic acid or a derivative thereof covalently bonded to the underlying carrier, it is required that the carrier have bound surface hydroxyl groups, so that the latter may form one end of a tether which results from reaction of the bound surface hydroxyl groups with a silane functionality on a compound to form a covalent OSi bond as part of the structure, carrier—OSi—($CH_2$)—NH—spacer. The progenitor of the spacer portion of our invention has the formula $(AO)_x SiHal_y$ ($CH_2$)$_n$—NH—. The silane part of our spacer progenitor contains either halogen, Hal, or alkoxy groups, AO, either alone or in combination. Chlorine is by far the most common halogen which may be used in the practice of our invention, although bromine also may be used equally well. As for the alkyl group of AO, A may be any alkyl group, but preferably is a lower alkyl having from 1 through about 6 carbon atoms, with 1 and 2 carbon alkyl groups particularly desirable. The silicon atom is separated from the nitrogen atom by a chain of methylene groups, $CH_2$. The length of this chain is given by n which is an integer between 2 and about 10, with n=2 to 4, especially desirable. The subscripts x and y also are integers where their sum is equal to 3.

Yohimbinic acid and its derivatives in all cases constitute the chiral organic material in the chiral stationary phase of our invention. For convenience, yohimbinic acid itself is given by the formula, ($R_1$=OH,$R_2$=$R_3$=H).

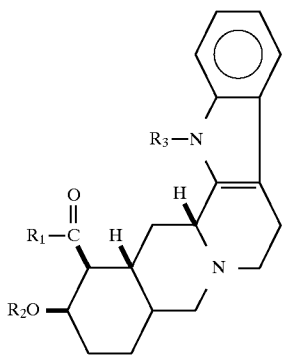

One notes that yohimbinic acid contains three centers which are easily substituted or derivatized, giving rise to the variables $R_1$, $R_2$, and $R_3$. $R_1$ is selected from the group consisting of hydroxyl, amido, and alkoxy moieties containing from 1 up to about 20 carbon atoms, and aryloxy and aralkyloxy moieties containing from 7 up to about 20 carbon atoms. $R_2$ and $R_3$ may be different with each being selected from the group consisting of hydrogen, alkyl moieties containing from 1 up to about 20 carbon atoms, alkylaminocarbonyl moieties having 2 to 10 carbon atoms, arylaminocarbonyl moieties having 6 to about 10 carbon atoms, and acyl moieties containing from 2 up to about 20 carbon atoms.

When used as a coating, the passivated carrier is merely allowed to contact a suitable solution of yohimbinic acid or a derivative thereof for a time effective to adsorb the latter onto the passivated inorganic oxide and form a coating thereon. Typically, the amount of yohimbinic acid or its derivatives adsorbed on the underlying passivated carrier amounts to from about 0.2 up to about 8 wt. % relative to the final product.

Where the chiral organic phase is covalently bonded to the underlying carrier, covalent bonding occurs via the carboxylic acid portion of the yohimbinic acid. A generalized representation of the resulting covalently bonded chiral stationary phase is given below:

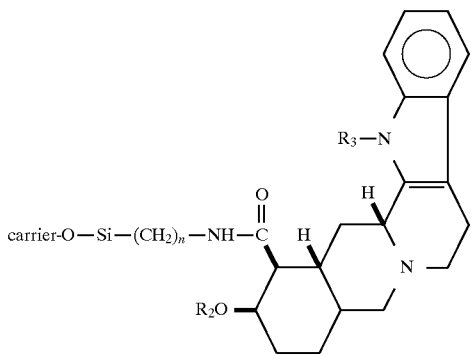

The groups $R_2$ and $R_3$ are the same as have been defined above for the coated variant of our invention and need not be repeated here. In the covalently bonded variant of our invention, the yohimbinic acid or a derivative thereof may be present in an amount from about 0.2 up to about 8 wt. % based on the finished chiral stationary phase.

The examples which follow merely illustrate some specific embodiments of our invention, which is not limited thereto. Other variants and embodiments will be clear to the skilled artisan.

EXAMPLE 1

Ionically-Bound (+)-Yohimbinic Acid. A commercial analytical HPLC column (4.6 mm I.D. by 25.0 cm long) containing 3-aminopropyl-silanized silica gel (5 micron, Adsorbosphere $NH_2$ from Alltech Associates) was attached to a liquid chromatograph and equilibrated with 10% 2-propanol in hexane at 1.0 mL/min. To insure that the support was in its free-base form, it was equilibrated sequentially at 2.0 mL/min with 25 mL of dry THF, 1.2 g of triethylamine in 25 mL of THF, and 30 mL of THF. The column was then treated with a mobile phase prepared by dissolving 0.51 g of (+)-yohimbinic acid monohydrate (Aldrich Chemical Company) in 150 mL of THF. The clear, colorless solution was pumped through the column at 2.0 mL/min. The column then was flushed with 40 mL of pure THF, then equilibrated with 10% 2-propanol in hexane at 1.0 mL/min.

EXAMPLE 2

Covalently Bound (+)-Yohimbinic Acid. To a 100 mL, three-necked, round-bottomed flask equipped with a reflux condenser, a thermometer (attached to a Therm-o-watch temperature controller), a Teflon-coated stirring bar, and a heating mantle, was added 1.00 g (2.790 mmol) of (+)-yohimbinic acid and 40 mL of a mixture of dry pyridine and benzene (Aldrich Chemical Company). To the top of the condenser was attached a 10 mL equilibrated dropping funnel and a nitrogen line. To the dropping funnel was added 0.726 g (2.790 mmol) of 3-isocyanatopropyltriethoxysilane (95%, Huls America) dissolved in about 10 mL of dry pyridine. The flask contents were stirred, heated to 80° C., and the isocyanate slowly added over a 15 minute period. The benzene was distilled from the reaction until the temperature reached 90° C., then the reaction was allowed to proceed for about 24 hours more. After 24 hours, the contents (now containing the amide product from the reaction of the acid moiety of the yohimbinic acid with the isocyanate group of the organosilane) were stripped of a portion of the pyridine. The pyridine removed was replaced with dry benzene.

Stripping may be carried out using a stream of dry nitrogen or by pouring the contents into a 100 mL, single-necked, round-bottomed flask and stripping the pyridine from the reaction mixture using a rotary evaporator (set at 85° C.) and reduced pressure. The residue was returned to the same 100 mL reaction apparatus, which was equipped as before except the dropping funnel was removed and a Dean-Stark trap was added between the flask and the condenser. The nitrogen line was attached to the top of the condenser.

To the reaction residue were added 60 mL of benzene followed by 4.00 g of 5 $\mu$ silica gel. The slurry was gently stirred and the reaction mixture brought to reflux. Periodically, about 20 mL of benzene were removed from the trap and replaced with fresh, dry benzene.

At the end of 16 hours, the reaction was stopped and the contents filtered on a 60 mL (M) sintered glass funnel. The filter cake was washed sequentially (3×30 mL) with pyridine, acetone, methanol, acetone, and pentane then air dried in the funnel. The modified silica gel was fully dried in a vacuum oven at 5 torr for 3 hours at about 60° C. The yield was 4.23 g of very pale yellow powder.

EXAMPLE 3

Covalently-Bound, Derivatized (+)-Yohimbinic Acid. The modified silica gel product made using the method of Example 2 may be further treated in the following manner to enhance its chiral discrimination.

To a 100 mL, three-necked, round-bottomed flask equipped with a reflux condenser with a nitrogen line attached, a thermometer (attached to a Therm-o-watch temperature controller), a Teflon-coated stirring bar, and a heating mantle, were added 5.00 g of the (+)-yohimbinic-modified silica gel of Example 2 and 70 mL of dry dichloromethane (Aldrich Chemical Company). While gently stirring the reaction slurry, 0.71 g (6.963 mmol) of triethylamine (Aldrich) was added to the slurry followed by 2.11 g (8.70 mmol) of 3,5-dinitrobenzoyl chloride. The formation of hydrogen chloride gas was almost immediate. The slurry quickly thickened, but stirring became easier as the reaction progressed. After 24 hours, 0.18 g of additional triethylamine was added and the reaction was brought to reflux for one hour. At this time, the reaction was stopped and the modified silica gel was filtered on a sintered glass funnel and washed (3×20 mL) sequentially with dichloromethane, acetone, methanol, acetone, and pentane. The modified silica gel was dried in vacuo for 2 hours at 60° C. to yield a powder.

EXAMPLE 4

Covalently-Bound, In Situ-Derivatized (+)-Yohimbinic Acid. The same product of Example 3 may be obtained by first packing the product of Example 2 into an HPLC column, then derivatizing the stationary phase in situ.

The modified silica gel support prepared according to the procedure in Example 2 was slurry-packed into a stainless steel HPLC column 4.6 mm I.D. by 25.0 cm long. The HPLC column was attached to a liquid chromatograph for in situ derivatization. Through the HPLC column (previously equilibrated using 10% 2-propanol in hexane) were pumped 40 mL of pure hexane, followed by 40 mL of 50:50 hexane/dichloromethane, and then 40 mL of pure dichloromethane—all at a flow rate of 2.0 mL/min. While maintaining the flow rate at 2.0 mL/min, a solution of 2.11 g (8.70 mmol) of 3,5-dinitrobenzoyl chloride (Lancaster) in dry dichloromethane was pumped through the HPLC column. Upon completion, the column was flushed with 40 mL of pure dichloromethane. The final flushing used 20% 2-propanol in hexane until a constant baseline is obtained. The following tables summarize our results.

TABLE 1

Separation of Racemates on Ionically-Bound (+)-Yohimbinic Acid[a]

| Racemate | $t_{R1}$[b] | $t_{R2}$[b] | $k'_1$[c] | $k'_2$[c] | α |
|---|---|---|---|---|---|
| 9-MAC[d] | 17.05 (R) | 17.71 (S) | 4.79 | 5.02 | 1.05 |
| Benzoin | 11.59 (S) | 12.42 (R) | 2.94 | 3.22 | 1.10 |
| Flavanone | 4.79 | 4.91 | 0.628 | 0.668 | 1.06 |
| Indanol | 6.32 (R) | 6.65 (S) | 1.14 | 1.24 | 1.09 |
| α-Methyl-2-naphthalene-methanol | 7.71 | 8.37 | 1.62 | 1.85 | 1.14 |
| 1-Phenethyl alcohol | 5.76 (R) | 6.07 (S) | 0.958 | 1.06 | 1.11 |

[a]Mobile phase was 10% 2-propanol in hexane at 1.0 mL/min; UV Detector set at 254 nm
[b]Retention time (minutes) of enantiomers
[c]Capacity factor of each enantiomer
[d]2,2,2-Trifluoromethyl-1-(9-anthryl) ethanol.

TABLE 2

Comparison of Ionically-Bound (+)-Yohimbinic Acid on Aminopropyl-Silica Gel with Two Commercial Columns[a]

| Racemate | (+)-Yo[b] α, (k'1) | Chiralcel OD[c] α, (k'1) | Whelk-O 1[d] α, (k'1) |
|---|---|---|---|
| 9-MAC[d] | 1.05 (4.79, R) | 3.06 (2.58, S) | 1.12 (1.50, S) |
| Phenethyl alcohol | 1.11 (0.96, R) | 1.21 (1.04) | 1.04 (0.80) |
| Benzoin | 1.10 (2.94, S) | 1.58 (2.98) | — |
| Flavanone | 1.06 (0.63) | 1.44 (1.73) | — |
| Indanol | 1.10 (1.15, R) | 1.14 (1.14, S) | — |
| α-Methyl-2-naphthalene-methanol | 1.14 (1.62) | 1.00 (2.59) | 1.00 (3.10) |

[a]Columns: 4.6 mm I.D. by 25.0 cm long; Eluent was 10% 2-propanol in hexane, flow rate 1.0 mL/min., with Detector (UV) at 254 nm
[b]α is a separation factor; k is capacity factor
[c]Chiralcel OD (Daicel Chemical Industries, LTD) is a derivatized cellulose ionically-bound to aminoproylsilanized silica gel
[d]Whelk-O 1 (Regis Technologies, Inc.) is a covalently-bound stationary phase based on 4-(3,5-dinitrobenzamido)-tetrahydrophenanthrene[2,2,2-trifluoromethyl-1-(9-anthryl) ethanol]

TABLE 3

Separation or Enrichment of Racemates on Ionically-Bound (+)-Yohimbinic Acid[a]

| Racemate | $t_{R1}$[b] | $t_{R2}$[b] | $k'_1$[c] | $k'_2$[c] | α |
|---|---|---|---|---|---|
| Flavanone | 5.22 | 5.42 | 0.903 | 0.977 | 1.08 |
| Benzoin | 19.42 | 20.48 | 6.09 | 6.47 | 1.06 |
| 2,2,2-Trifluoro-1-phenylethanol | 16.96 | 18.14 | 5.19 | 5.62 | 1.08 |

[a]Column: 4.6 mm I.D. by 25.0 cm long, 5 μ particle size, 2% 2-propanol in hexane eluent, flow rate 1.0 mL/min, detector (UV) at 254 nm
[b]Retention time (minutes) of enantiomers
[c]Capacity factor of each enantiomer

TABLE 4

Evaluation of Covalently-Bound (+)-Yohimbinic Acid onto Silica Gel Using the Method of Example 2[a]

| Racemate | $t_{R1}$[b] | $t_{R2}$[b] | $k'_1$[c] | $k'_2$[c] | α |
|---|---|---|---|---|---|
| 9-MAC[d] | 15.95 | 16.67 | 4.85 | 5.11 | 1.05 |
| Benzoin | 9.74 | 10.10 | 2.57 | 2.70 | 1.05 |

[a]Column: 4.6 mm I.D. by 25.0 cm long, 5 μ particle size, 10% 2-propanol in hexane eluent, flow rate 1.0 mL/min, detector (UV) at 254 nm
[b]Retentino time (minutes) of enantiomers
[c]Capacity factor of each enantiomer
[d]2,2,2-Trifluoromethyl-1-(9-anthryl) ethanol.

I claim as my invention:

1. A chiral stationary phase comprising a refractory inorganic oxide coated with material I having the formula,

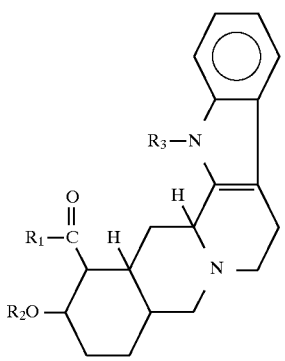

where: $R_1$ is selected from the group consisting of hydroxyl, amido, alkoxy moieties containing from 1 up to about 20 carbon atoms, aryloxy, and aralkoxy moieties containing from 7 up to about 20 carbon atoms; $R_2$ and $R_3$ are selected from the group consisting of hydrogen, alkyl moieties containing from 1 up to about 20 carbon atoms, alkylaminocarbonyl moieties having two to 10 carbon atoms, arylaminocarbonyl moieties having 6 to about 10 carbon atoms, and acyl moieties containing from 2 up to about 20 carbon atoms.

2. The chiral stationary phase of claim 1 where the refractory inorganic oxide is silica.

3. The chiral stationary phase of claim 1 where the material I is yohimbinic acid.

4. The chiral stationary phase of claim 1 where $R_1$ is an amido moiety, an alkyl moiety having from 1 up to about 20 carbon atoms, or an aralkyl moiety with from 7 up to about 20 carbon atoms, and $R_2$, $R_3$ each are hydrogen.

5. The chiral stationary phase of claim 1 where $R_1$ and $R_3$ each are hydrogen, and $R_2$ is selected from the group consisting of an alkyl having from 1 up to about 20 carbon atoms, an aralkyl with from 7 up to about 20 carbon atoms, alkylaminocarbonyl moieties having two to 10 carbon atoms, arylaminocarbonyl moieties having 6 to about 10 carbon atoms, and an acyl having from 2 up to about 20 carbon atoms.

6. The chiral stationary phase of claim 1 where $R_1$ and $R_2$ each are hydrogen, and $R_3$ is selected from the group consisting of an alkyl having from 1 up to about 20 carbon atoms, an aralkyl with from 7 up to about 20 carbon atoms, alkylaminocarbonyl moieties having two to 10 carbon atoms, arylaminocarbonyl moieties having 6 to about 10 carbon atoms, and an acyl having from 2 up to about 20 carbon atoms.

7. A chiral stationary phase comprising: a carrier of a refractory inorganic oxide covalently bonded via bound surface hydroxyl groups to silicon atoms contained in a spacer agent of formula $(RO)_x Hal_y Si(CH_2)_n NH$—, where R is an alkyl group, Hal is a halogen, x and y are integers such that x+y=3, and n is an integer from 1 up to about 12, and where said spacer agent is covalently bonded at the nitrogen atom to the acyl group of yohimbinic acid and its derivatives.

8. A chiral stationary phase represented by

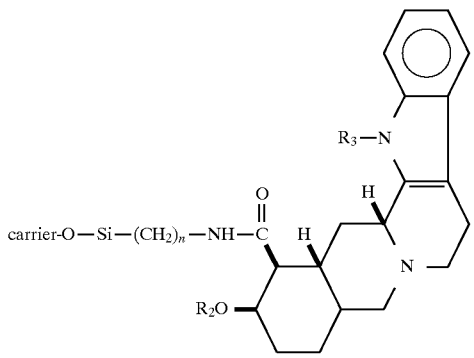

where carrier represents a refractory inorganic oxide having bound surface hydroxyl groups, O—Si is the covalent bond between the bound surface hydroxyl groups of said refractory inorganic oxide, and where $R_2$ and $R_3$ are selected from the group consisting of hydrogen, alkyl moieties containing from 1 up to about 20 carbon atoms, alkylaminocarbonyl moieties having two to 10 carbon atoms, arylaminocarbonyl moieties having 6 to about 10 carbon atoms, and acyl moieties containing from 2 up to about 20 carbon atoms.

9. The chiral stationary phase of claim 8 where the refractory inorganic oxide is silica.

* * * * *

UNITED STATES PATENT AND TRADEMARK OFFICE
CERTIFICATE OF CORRECTION

PATENT NO. : 5,807,482
DATED : Sep. 15, 1998
INVENTOR(S) : HOUSE

It is certified that error appears in the above-identified patent and that said Letters Patent is hereby corrected as shown below:

In Claim 1, insert at the end of the drawing and before the text --I--.

Signed and Sealed this

Fifteenth Day of December, 1998

Attest:

BRUCE LEHMAN

*Attesting Officer*            *Commissioner of Patents and Trademarks*